April 21, 1959
W. H. DAWSON, JR
2,882,615
APPARATUS FOR SIMULATING TURBO-JET AIRCRAFT ENGINE OPERATION
Filed May 15, 1956
3 Sheets-Sheet 1
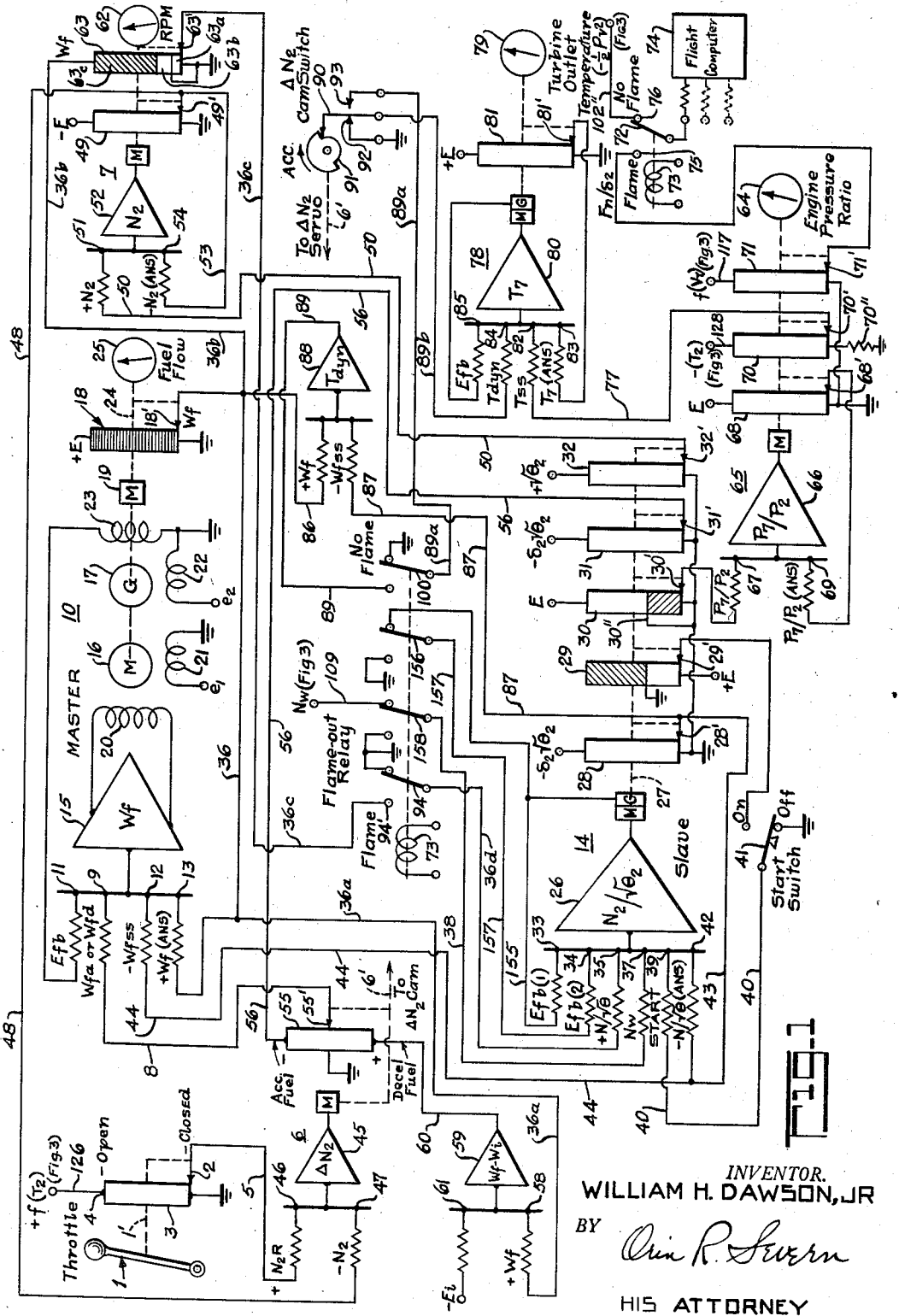
INVENTOR.
WILLIAM H. DAWSON, JR
BY
HIS ATTORNEY

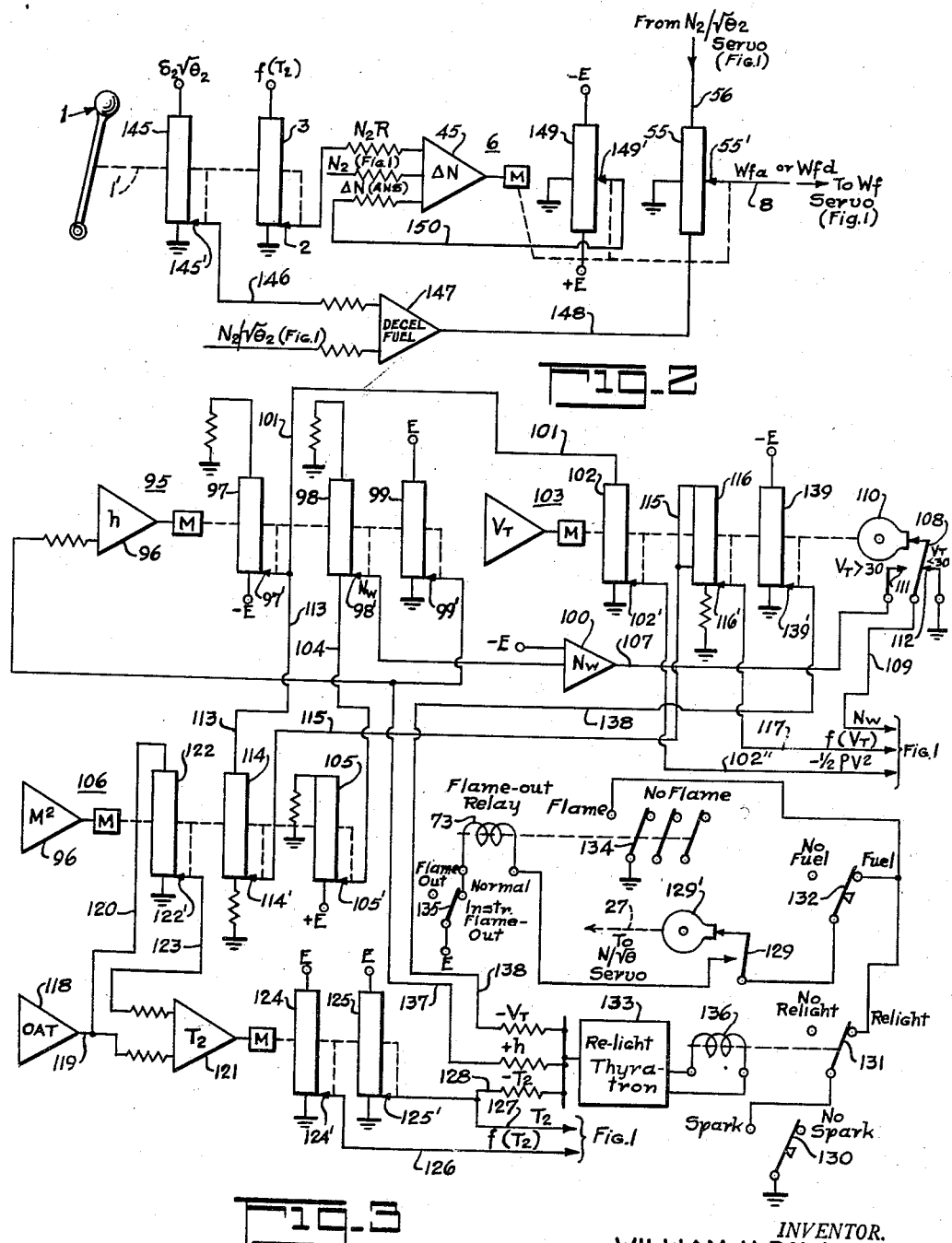

April 21, 1959     W. H. DAWSON, JR     2,882,615
APPARATUS FOR SIMULATING TURBO-JET AIRCRAFT ENGINE OPERATION
Filed May 15, 1956     3 Sheets-Sheet 3
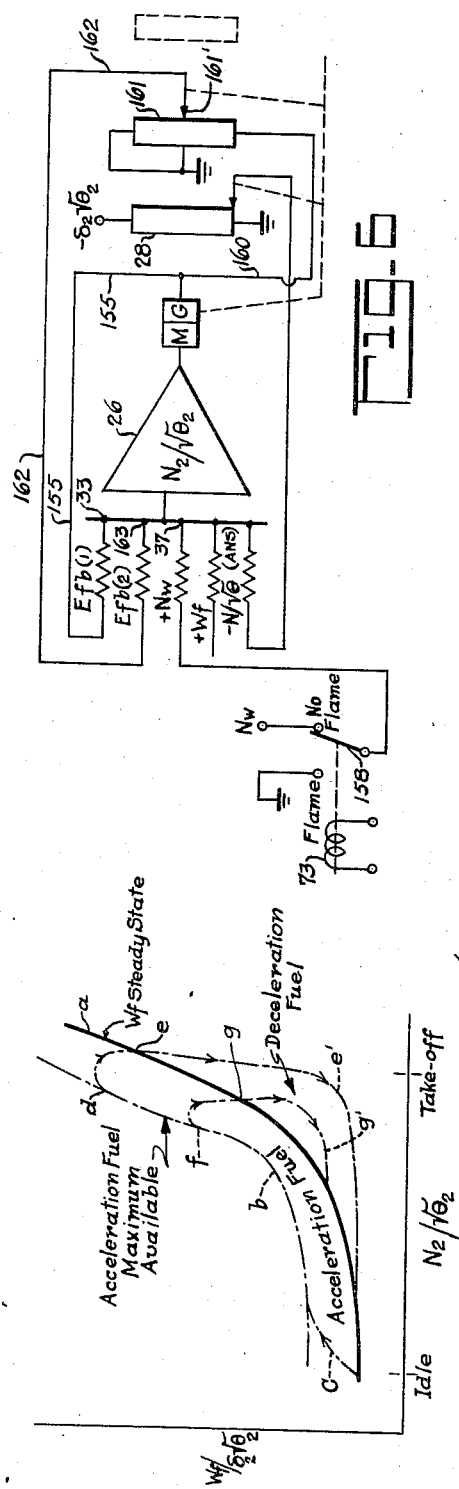
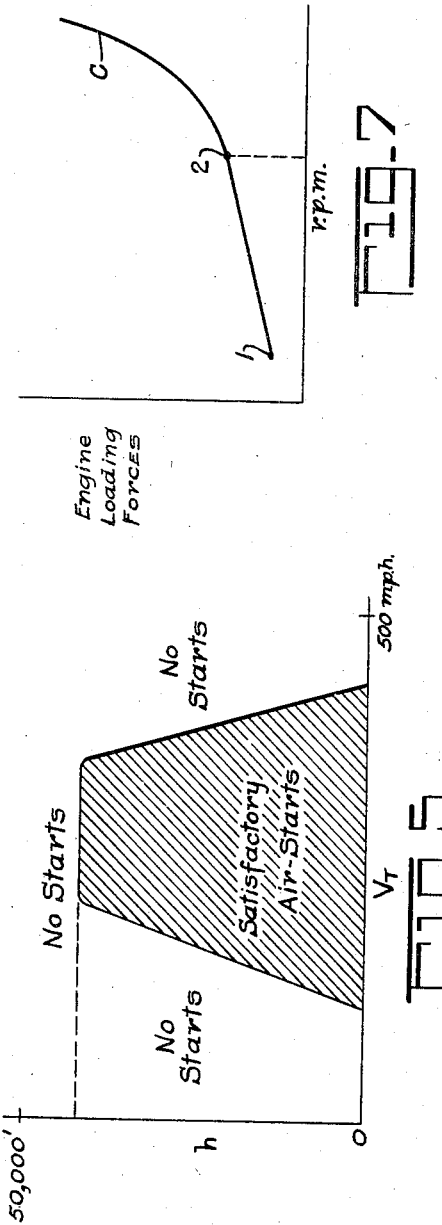
*INVENTOR.*
WILLIAM H. DAWSON, JR.
BY
HIS ATTORNEY

United States Patent Office 2,882,615
Patented Apr. 21, 1959

2,882,615

APPARATUS FOR SIMULATING TURBO-JET AIRCRAFT ENGINE OPERATION

William H. Dawson, Jr., Waldwick, N.J., assignor to Curtiss-Wright Corporation, a corporation of Delaware Application May 15, 1956, Serial No. 584,915

25 Claims. (Cl. 35—12)

This invention relates to apparatus for simulating the steady-state and dynamic operating characteristics of turbo-jet aircraft engines, and has for its principal object improved apparatus of the aforesaid character that accurately and realistically simulates important and critical phases of engine operation which are usually indicated by instrument readings of fuel flow, turbine r.p.m., engine pressure ratio and turbine outlet temperature.

Another important object of the invention is improved simulating apparatus of the aforesaid character useful in the ground training and instruction of aircraft personnel.

Accurate simulation of the steady-state and dynamic characteristics of jet engines is useful, not only for design purposes in predicting performance of newly designed aircraft, but also for familiarizing the jet pilot and crew with the responses and operating characteristics of the engine. The proper operation of modern turbo-jet engines in high speed aircraft requires that the pilot have thorough knowledge of the characteristic r.p.m. temperature and other response of his engine to throttle operation, airspeed (or Mach number), altitude and other relevant factors. For example, the tail pipe temperature is a very critical factor in gas turbine operation since it determines the life of the turbine and therefore the functioning of the aircraft itself. When the throttle is opened and more fuel is added to accelerate the turbine, there is an immediate increase in tail pipe temperature due to the lagging response of the turbine rotor; i.e. the added heat energy is not immediately absorbed by the rotor because of factors such as inertia and compressor load. This temperature increase should be understood by the pilot and limited to brief duration; otherwise damage to the turbine might result. Other factors, such as altitude and Mach number also materially affect turbine r.p.m. and tail pipe temperature under given conditions of fuel flow. For these reasons it is very important that jet pilots be given thorough and realistic ground training in the proper handling of the jet engine controls.

Certain basic parameters involving ambient factors and Mach number (M) are used in the equations determining the operation of the jet engine simulating apparatus of the present invention and are as follows:

$\sqrt{\theta_2}$ square root of the adiabatic temperature ratio, $\delta_2\sqrt{\theta_2}$ relative pressure ratio (ram/ambient) × square root of adiabatic temperature ratio.

The ratios $\theta_2$ and $\delta_2$ are well-known aerodynamic terms and further discussion thereof is not necessary for the purposes of this specification. Mach number is the numerical ratio of the instantaneous speed of the aircraft to the speed of sound at the temperature of the surrounding air and is an important factor affecting both airplane and engine performance.

The basic equations for engine r.p.m. and fuel flow used in the simulating apparatus of the present invention may be expressed in accepted aerodynamic terms as follows:

$$W_f/\delta_2\sqrt{\theta_2}=Kf(N_2/\sqrt{\theta_2}) \qquad \text{Equation (I)}$$
$$W_f=K\delta_2\sqrt{\theta_2}f(N_2/\sqrt{\theta_2}) \qquad \text{Equation (II)}$$
$$N_2/\sqrt{\theta_2}=f(W_f)1/\delta_2\sqrt{\theta_2} \qquad \text{Equation (III)}$$

where $W_f$=engine weight fuel flow rate in lbs./hr.
$N_2$=high compressor rotor (turbine) r.p.m. and K is a constant determined by engine design.

The engine simulated herein is of the well-known "twin-spool" type having high and low compressor rotors; however it will be apparent that the present invention is not limited to this specific type.

The above equations are applicable to steady-state conditions and are used in practicing the present invention for maintaining the proper balance between computing systems representing respectively instantaneous fuel flow and steady-state fuel flow during stabilized conditions. System control is accomplished by disturbing the balanced relationship by means of a momentary error signal representing the increment acceleration or deceleration fuel above or below steady-state fuel.

The steady-state simulation makes use of so-called "corrected" engine parameters which inherently include the effects of variations in ambient conditions. The dynamic simulation is based on matching the characteristics of the fuel regulator in the actual engine. The simulation takes into account all the important independent and dependent variables, the independent variables including ambient temperature, ambient pressure, airspeed and throttle setting. The primary dependent variables, which are computed as functions of independent variables, include turbine r.p.m., thrust, engine pressure ratio, fuel flow and turbine outlet temperature. The use of "corrected" parameters leads to relatively simple basic relations between dependent and independent variables, and results in simplification and therefore more precise operation of the simulating apparatus of this invention.

For steady-state (or static) characteristics, the "corrected" variables used herein include:

($T_2$) Compressor inlet temperature
($\delta_2$) Compressor inlet pressure ratio
(M) Mach number
($N_2/\sqrt{\theta_2}$) Corrected rotor speed
($P_7/P_2$) Engine pressure ratio (turbine outlet pressure/compressor inlet pressure)
($T_7/T_2$) Engine temperature ratio (turbine outlet temperature/compressor inlet temperature)
($F_n/\delta_2$) Corrected thrust
($W_f/\delta_2\sqrt{\theta_2}$) Corrected fuel flow For the dynamic characteristics, the critical factor in the simulation of turbo-jet transients is the engine fuel regulator. The simulating apparatus is adapted to sense the "actual" and "requested" r.p.m. signals as in the engine itself, determine the magnitude and sense of the error signal, and vary the amount of simulated fuel flow as a function of the error signal. This variation in fuel flow produces simulated acceleration or deceleration of the engine until a new steady-state condition is attained.

The invention will be more fully set forth in the following description referring to the accompanying drawings, and the features of novelty will be pointed out with particularity in the claims annexed to and forming a part of this specification.

Referring to the drawings, Fig. 1 is a diagrammatic illustration of a system embodying the present invention for simulating steady-state and dynamic characteristics of a turbo-jet aircraft engine including means responsive to throttle manipulation for determining and indicating simulated engine fuel flow, turbine r.p.m., engine pressure ratio and turbine outlet temperature;

Fig. 2 illustrates a modified alternative form of a portion of the circuitry of Fig. 1 relating to determination of the r.p.m. error signal;

Fig. 3 illustrates diagrammatically a plurality of interrelated electrical systems for producing signals representing simulated flight and atmospheric factors for use in the engine simulating system of Figs. 1 and 2;

Fig. 4 illustrates graphically typical steady-state and dynamic characteristics of a turbo-jet aircraft engine that are simulated by the present invention.

Fig. 5 graphically illustrates the primary ambient and flight conditions determining "air-starts" or "re-lights";

Fig. 6 is a diagrammatic illustration of an alternative arrangement for producing r.p.m. feed-back for realistically simulating rotor inertia, compressor loading effects, etc., during acceleration and deceleration.

Fig. 7 graphically illustrates the general relationship between r.p.m. and inertia, compressor loading, etc., as affecting acceleration and deceleration.

Referring to Fig. 1, a simulated engine throttle lever or control 1 is suitably connected by means indicated at 1' to the brush or slider contact 2 of a potentiometer 3 for deriving therefrom a signal voltage representing the requested turbine r.p.m. according to positioning of the throttle. The potentiometer is grounded as illustrated at its lower terminal (representing closed-throttle) and is energized at its upper terminal 4 (open-throttle) by an a.c. signal voltage $f(T_2)$ representing a function of the simulated compressor inlet temperature. The means for deriving this signal will be described hereinafter in connection with Fig. 3. The requested r.p.m. signal ($N_2R$) derived at slider 2 is fed by conductor 5 to the input side of a comparing system 6 where it is compared with a signal representing the actual turbine r.p.m. ($N_2$) derived as hereinafter described from the $N_2$ servo system 7. The difference or error signal produced by the comparing system 6 is represented as $\Delta N_2$, i.e. the change in r.p.m. requested, and is fed by conductor 8 to the input terminal 9 of a servo system 10 representing actual engine fuel flow ($W_f$). The other a.c. input signals for the servo system 10 comprise a system feed-back signal ($E_{fb}$) at terminal 11, a signal ($W_{fss}$) at terminal 12 representing steady-state fuel flow and a system "answer" signal ($W_f$) at terminal 13. The steady-state signal $W_{fss}$ is derived from another computing servo system 14 that is coupled to the servo system 10 so as to function as a "slave" servo during dynamic phases of fuel flow.

The servo system 10 is in general representative of the apparatus and circuitry used in the other servo systems herein referred to so that one description thereof will be sufficient for the purposes of this specification. The system 10 which is of the integrating type comprises a servo amplifier 15 which is fed by the aforesaid a.c. signal voltages at the input terminals 9, 11, 12 and 13, and a motor 16 that is responsive to the amplifier output for driving a feedback generator 17 and potentiometer 18, the latter being operatively connected through a reduction gear box 19 to the motor-generator. For simplicity of illustration the potentiometer card 18 only is illustrated herein as being wound with resistance wire, it being apparent that the other cards may be wound as required. The servo amplifier 15 is of the summing type for determining the resultant of the respective a.c. input signal voltages which represent static and dynamic conditions of fuel flow. For computing purposes suitable proportioning resistances are included as illustrated in the amplifier input circuits. Amplifiers of this type are well-known in the art for algebraically summing a plurality of individual a.c. voltages of varying magnitude and polarity and a detailed circuit illustration thereof is unnecessary.

That part of the servo network including a motor-generator set (or motor) is diagrammatically indicated in other parts of the drawings as M—G, or M as the case may be. The motor 16 is of the two-phase type, the control phase winding 20 being energized by the servo amplifier output as indicated and the other phase winding 21 by a constant reference a.c. voltage $e_1$ dephased 90° from the control voltage. The operation of this type of motor is well-known, the rotation being in one direction when the control and reference voltages in the respective phases have the same instantaneous polarity, and in the opposite direction when the instantaneous polarity of the control voltage is reversed with respect to the reference voltage, the rate of rotation in both cases depending on the magnitude of the control voltage. The motor control circuitry is shown in elementary form in the interest of clearness and it will be understood that known circuitry for improving motor characteristics, such as obtaining fast response, etc., may be used as desired.

The motor drives a two-phase feed-back generator 17 also having the reference phase winding 22 energized by a 90° dephased reference voltage $e_2$, the other phase winding 23 generating a velocity feed-back voltage $E_{fb}$ for the purposes of speed control. The voltage $E_{fb}$ which may vary in magnitude and polarity according to the speed and direction of rotation of the generator, represents rate of change of fuel flow and is applied to the amplifier input terminal 11. The motor also serves to gang-operate through the gear reducer 19 and suitable mechanical connections indicated by dotted lines 24 one or more potentiometers and indicators; in the present case, the potentiometer 18 and an indicator 25 representing fuel flow are driven by the motor.

The individual potentiometer resistance elements, such as the unit 18, may be of the well-known wound-card type and are of circular or band form in practice but are diagrammatically illustrated in a plane development for clearness. A structural arrangement that may be conveniently used for a servo motor and potentiometer combination of the character above referred to is shown by Patent No. 2,431,749 issued December 2, 1947, to R. B. Grant for "Potentiometer Housing and Positioning Structure." Operation of the servo motor 16 in either direction therefore causes the potentiometer slider contact 18' to move to a corresponding angular position on the potentiometer element for deriving, i.e. selecting or picking off, a voltage dependent on the contact position.

Each potentiometer of each servo system is shaped or contoured so that the value of the derived voltage at the slider contact bears a desired relationship to the angular movement of the contact depending on the particular function of the potentiometer, and has a voltage impressed across its terminals depending as to instantaneous polarity and magnitude also on the function of the potentiometer. The contour of all function potentiometers represents the derivative of the function concerned and since this involves mathematical relationships the potentiometer cards are shown uniform for simplifying the disclosure. Specifically, the contour or width variation and therefore the resistance distribution of a potentiometer is proportional to the derivative of the function of the characteristic to be simulated with respect to the variable represented by the setting of the potentiometer. For example, let a linear function be assumed as where a derived voltage is to be directly proportional to the distance that the potentiometer contact is from a zero position. The slope of the function curve then is the constant ratio of derived voltage to the increase in the independent variable represented by the contact travel from the zero position. The derivative of this relationship is the same for all contact settings so that the width of the potentiometer card in this case is uniform, making it rectangular in shape. Thus the width of the card at any given contact position is determined by the linear or non-linear character of the function.

The relationship between the master and slave servo systems 10 and 14 respectively for simulating the steady-state and dynamic characteristics of the engine fuel flow will now be generally described. Essentially these servos are coupled so that each feeds the other, and in the steady-state condition both servos are balanced, i.e., in effect electrically locked together and positioned to represent computed fuel flow $W_f$. For dynamic conditions however, the system 10 which has relatively fast response, receives first from the system 6 a $\Delta N_2$ signal according to the new throttle setting and immediately moves ahead and out of step with the system 14 which has slower characteristic response. Assuming that the new throttle setting is not immediately changed, the slave system 14 is pulled by the master system 10 again into step, to represent a new steady-state fuel condition. The time lag of the slave system with respect to the master system is determined according to the characteristic inertia lag of turbine speed with respect to variation in fuel for the particular engine simulated. For realistic simulation therefore, the slave system (which actually computes the factor $N_2/\sqrt{\theta_2}$) is especially adapted to control additional systems representing actual turbine r.p.m. ($N_2$), engine pressure ratio ($P_7/P_2$) and turbine outlet temperature (TOT), as will be later described. The TOT system is in addition controlled by dynamic signals produced jointly by the master and slave systems so as to simulate characteristic TOT increase during acceleration, such as incidental to a throttle "burst" for example.

Referring again to Fig. 1, the slave servo system 14 comprises a servo summing amplifier 26 which is energized by a number of a.c. input signals and which in turn energizes the servo motor M in the manner above described. The M—G set (with gear box) gang-operates through suitable mechanical connections indicated at 27 the slider contacts of a plurality of function potentiometers 28, 29, 30, 31 and 32 respectively. The input signals for the slave servo amplifier 26 comprise velocity feed-back signals at terminals 33 and 34 for rate control from the feed-back generator G, a signal $N_2/\sqrt{\theta_2}$ at terminal 35 from the $W_f$ answer card 18, normally over line 36b, $N_2$ card 63, line 36c, flame-out relay switch 94 and line 36d; a signal $N_w$ at terminal 37 over line 38 for "windmilling" conditions; a "start" signal at terminal 39 over line 40 and start switch 41 from the servo card 29, and an answer signal $N_2/\sqrt{\theta_2}$ at terminal 42 over line 43 from the servo card 28. This answer signal is also fed over line 44 to the input terminal 12 of the $W_f$ servo since it also represents the steady-state fuel $W_{fss}$; also the answer voltage $W_f$ of the master system normally energizes the slave system at terminal 35. Accordingly, it will be seen that the master and slave systems are mutually coupled to compute fuel flow through their respective answer voltage circuits.

The steady-state fuel flow computation primarily takes place at the slave system 14 in accordance with the formula for fuel flow above referred to. The servo card 28 is energized at its upper terminal by a signal representing $\delta_2\sqrt{\theta_2}$ so that the derived voltage at slider 28' (which is displaced according to $N_2/\sqrt{\theta_2}$) represents $W_{fss}$ according to the above fuel flow Equation II. This computation basically controls the master servo, as where the latter is positioned during substantially "steady-state" conditions by the "slave" servo in accordance with variations in the adiabatic, etc., factors.

When the fast-response master system is operated in accordance with a called-for change in r.p.m., the answer signal over line 36b, etc., which is immediately responsive to servo operation, energizes the slave system so as gradually to bring it into step for the new steady-state condition. As the slave system responds, its answer voltage on line 44 increases or decreases as the case may be until it balances the master system answer voltage $W_f$. At this point both servos again come into balance to represent a new steady-state fuel condition, assuming of course that the throttle setting in the meantime has not again been changed.

The computing signals $\delta_2\sqrt{\theta_2}$ and $\sqrt{\theta_2}$ representing functions of the above-described pressure and adiabatic temperature ratios may be produced as disclosed for example in Patent No. 2,798,308 granted July 9, 1957, to Stern and Wakefield and assigned to the same assignee as the present invention.

The dynamic fuel signal corresponding to desired acceleration ($W_{fa}$) of deceleration ($W_{fd}$) is as previously indicated fed to the input terminal 9 of the master system from the $\Delta N_2$ system 6. This system which serves to match the characteristics of the engine fuel regulator, comprises a servo amplifier 45 energized by the signal $N_2R$ at input terminal 46 and a signal $N_2$ at terminal 47 over line 48 from the card 49 of the $N_2$ servo system 7.

Referring briefly to the $N_2$ servo, it in turn is energized by a signal from the slave servo card 32 over slider 32', line 50 and input terminal 51 of the $N_2$ servo amplifier 52. This $N_2$ input signal, which represents computed turbine r.p.m. according to Equation III is derived jointly by the energizing signal $\sqrt{\theta_2}$ on card 32 and the position of the slave servo representing $N_2/\sqrt{\theta_2}$. The signal voltage derived from the $N_2$ card 49 for use in the $\Delta N_2$ system above referred to also comprises the $N_2$ answer signal which is fed over line 53 to the amplifier input terminal 54. It will be seen that steady-state $N_2$ (derived from the slave servo) is normally determined as a function of throttle setting and $T_2$, i.e. according to $\Delta N_2$ since a new position of the $W_{fss}$ servo essentially depends on the $\Delta N_2$ signal.

Returning to the $\Delta N_2$ system 6, the difference, if any, between the signals $N_2R$ and $N_2$ results in an error signal from the $\Delta N_2$ amplifier 45 which energizes the servo motor M to cause positioning of the slider 55' of the $\Delta N_2$ card 55. For steady-state conditions the difference or error signal of course is zero. Its magnitude and sense depend on the amount of acceleration or deceleration indicated by the throttle movement. This card is grounded at its center and is energized at its upper and lower terminals by oppositely phased signals representing respectively available acceleration fuel and deceleration fuel so as to produce at slider 55' a dynamic signal representing that portion of the scheduled available acceleration fuel ($W_{fa}$) or deceleration fuel ($W_{fd}$) available under the then existing operating conditions.

The available acceleration fuel signal is produced at the slave servo card 31 (according to the energizing signal $\delta_2\sqrt{\theta_2}$ and the $N_2/\sqrt{\theta_2}$ servo position) and is fed over slider 31' and the line 56 to card 55. The card 31 is therefore designed according to the desired scheduled relation between available acceleration fuel and the instant steady-state corrected r.p.m. The deceleration fuel signal may be produced according to the difference between a constant signal $E_1$ applied to the terminal 61 of a summing amplifier 59 and the answer signal $W_f$ from the master system fed over lines 36 and 36a to the amplifier input terminal 58. The constant voltage $E_1$ at the input 61 represents idle fuel so that the output signal of the amplifier represents ($W_f - W_i$), that is, the available deceleration fuel flow over and above the idle fuel flow below which the throttle control is ineffective except to stop the engine. This signal is fed over line 60 to the $\Delta N_2$ card 55.

Accordingly, it will be seen that a new throttle setting, say toward "open" throttle increases the positive signal $N_2R$ at the $\Delta N_2$ amplifier, thereby temporarily overbalancing the signal $N_2$ so that the $\Delta N_2$ servo operates the slider 55' upwardly to an extent corresponding to the magnitude of the error signal. If on the other hand the throttle setting is changed toward "closed" throttle, the signal $N_2R$ is decreased so that the negative signal $N_2$ temporarily predominates and the slider 55' is moved downwardly to represent deceleration fuel. The dynamic signal so produced causes practically instantaneous response of the master servo 10 as previously described in a direction to indicate increase or decrease of fuel flow as the case may be, and this servo through its answer voltage $W_f$ thereupon sets in motion the slave servo 14 which after the characteristic time delay again comes into balance with the master servo by reason of the answer signal $W_{fss}$. The slave servo follows the master servo at a rate proportional to the $\Delta N_2$ signal and through its card 32 causes in turn a new adjustment of the $N_2$ servo so that the r.p.m. indicator 62 now represents the new steady-state turbine r.p.m. The resulting $N_2$ answer signal over line 48 is increased or decreased as the case may be until it balances the signal $N_2R$ whereby the $\Delta N_2$ servo is again centered at the steady-state condition. In practice the $\Delta N_2$ servo may require for stability purposes an answer signal, and if such is the case an answer card can be added as illustrated in the alternative form hereinafter described and shown by Fig. 2.

The steady-state and dynamic fuel flow characteristics are graphically illustrated by Fig. 4. The curve $a$ represents steady-state fuel flow, taking into account varying altitude, flight conditions and turbine r.p.m. This is a so-called "normalized" graph for representing in lieu of a family of curves basic engine characteristics under varying conditions. The ordinants of this graph are the parameters $W_f/\theta_2\sqrt{\theta_2}$ and $N_2/\sqrt{\theta_2}$. The maximum available acceleration fuel is represented by the dotted line curve $b$ so that the area between curves $a$ and $b$ can be considered as representing the maximum acceleration fuel increment. The proportion of simulated fuel available for acceleration that is actually used depends upon the magnitude of the r.p.m. error or $\Delta N_2$ signal.

Assuming that full-throttle acceleration is called-for from about the "idle r.p.m." position by moving the throttle forward, the acceleration fuel flow, which is represented by operation of the $W_f$ master servo, follows the curve $c$, starting from curve $a$ and coinciding with curve $b$ until it reaches a point $d$ that is close to the called-for r.p.m. At this point the $\Delta N_2$ signal becomes zero to simulate the "chop-off" of engine acceleration fuel by the fuel regulator and the $W_f$ servo again attains balance with the steady-state slave servo at the point $e$ on the curve $a$. Where a part-throttle opening from "idle" is simulated, the $W_f$ servo operates as before in coincidence with curve $b$ to a point $f$ for example, where it "chops-off" and assumes a steady-state at point $g$ on the curve $a$. Where the throttle is moved toward deceleration from a position represented by the study-state condition at point $e$ or $g$, for example, the deceleration fuel, i.e. the fuel increment subtracted from the steady-state fuel, is represented by the shaded areas respectively beneath the curve $a$, and the operation of the $W_f$ servo corresponds to the indicated deceleration fuel surve $e'$ or $g'$, as the case may be.

Engine pressure ratio $P_7/P_2$, i.e. the ratio of turbine outlet pressure to the compressor inlet pressure, is a function of corrected r.p.m. This ratio is indicated by instrument in actual aircraft and is used as an accurate and positive indication of thrust by the flight crew; hence simulation of means for representing the engine pressure ratio is desirable. Actually, the corrected thrust $F_N/\delta$ is computed as a function of engine pressure ratio and airspeed in order to obtain the desired degree of accuracy over the full airspeed range.

The engine pressure ratio computing system comprises a servo system 65 having a servo amplifier 66 which receives an input signal $f(N_2/\sqrt{\theta_2})$ at terminal 67 from the slave system card 30 at slider 30'. This signal represents the engine pressure ratio. The card 30 is grounded throughout its initial range as indicated at 30'' which represents the starting and windmilling ranges of r.p.m. wherein the engine pressure ratio is unity. The servo 65 has an answer card 68 for deriving at slider 68' an answer signal for the servo amplifier at input terminal 69. An indicator 64 is also driven by the servo motor to represent engine pressure ratio. The servo card 70 is energized by a signal voltage $T_2$ for deriving at slider 70' a signal representing the steady-state turbine outlet temperature $T_{ss}$, and card 71 is energized by a signal voltage $f(V_T)$ for deriving at slider 71' a signal representing the corrected thrust $F_N/\delta_2$. The thrust signal, under normal conditions of turbine operation, is fed through a switch 72 of the "flame-out" relay 73 to the "flight" computer generally indicated at 74. The flight computer per se which is used to compute flight conditions such as airspeed, aircraft attitudes, etc., forms no part of the present invention and may comprise any suitable electrical flight computing system such as that shown in U.S. Patent to Stern et al. No. 2,731,737 granted January 24, 1956. For normal operation i.e. when engine "flame" exists, the flame-out relay switch 72 is operated to close the thrust circuit at contact 75. When the flame-out relay is de-energized to indicate a "no flame" condition the switch engages contact 76 so as to connect a negative drag signal $\frac{1}{2}\rho V^2$ to the flight computer input.

The basic equation for steady-state turbine outlet temperature may be expressed as:

$$T_7 = T_2 f(P_7/P_2)$$

Simulation of TOT conditions during transients is based on the premise that turbo-jet engines operate in the fuel-air mixture range in which temperature is in general directly proportional to the fuel-air ratio. This ratio increases as acceleration fuel is added (since the compresser speed does not immediately change) so that the transient effects of $T_7$ during an unstable state may be simulated on the premise that increase in $T_7$ is responsive or proportional to the fuel-air ratio. Accordingly the transient or dynamic temperature signal can be represented as the difference between $W_f$ and $W_{fss}$, i.e. the acceleration fuel flow $W_{fa}$. As this signal represents the excess fuel over that required for steady-state $T_7$ it can be seen that the $T_7$ transient is actually a function of excess fuel and time, the latter factor depending on the time that the excess fuel remains available as a function of $N_2$. At low r.p.m. both $W_{fa}$ and $N_2$ tend to increase the peak temperatures since $N_2$ approaches the steady-state point more slowly and air flow increases only slightly as compressor r.p.m. increases. The over-all equation for $T_7$ including both steady-state and dynamic conditions may therefore be expressed as:

$$T_7 = [K_1 T_2 f(P_7/P_2)] + [K_2(W_f - W_{fss})]$$

where $K_1$ and $K_2$ are constants depending on engine design.

Returning to the $P_7/P_2$ servo card 70 which is designed according to the above equation to produce a signal representing $T_{ss}$, this signal is fed by line 77 to the $T_7$ computing system 78 which is adapted to represent both the steady-state and dynamic turbine outlet temperature at indicator 79. The system 78 comprises a servo amplifier 80, the output of which energizes a motor for in turn driving the indicator 79 and the slider 81' of the answer card 81. The input signals for the amplifier comprise the steady-state signal $T_{ss}$ at terminal 82, the answer signal at terminal 83, a dynamic (acceleration) signal at terminal 84 and a velocity feed-back signal at terminal 85. The steady-state temperature $T_{ss}$ is determined, as above indicated, by the relationship of $T_7/T_2$ and $P_7/P_2$. The dynamic signal for the $T_7$ system is determined according to the difference between the answer signals of the master and slave systems respectively, i.e. according to the difference between $W_f$ and $W_{fss}$. The signals representing these values are fed by lines 86 and 87 respectively from the master card 18 and the slave card 28 to a comparing amplifier 88 having matched input resistances, the output of which represents the difference or dynamic temperature signal $T_{dyn}$. This signal normally is fed over line 89, flame-out relay switch 100 and line 89a, through the $\Delta N_2$ cam switch 90 and line 89b to the $T_7$ input terminal 84. The cam switch 90 is controlled by a cam 91 driven by connection 6' from the $\Delta N_2$ servo 6 so that the switch 90 is grounded at contact 92 to indicate "no signal" when the cam is positioned to indicate a deceleration condition, and is closed on the contact 93 to connect the $T_7$ amplifier with the comparing amplifier 88 when $\Delta N_2$ servo is in the acceleration position. Thus the $T_7$ indicator 79 will indicate sudden temporary increases of tail pipe temperature to simulate the transient condition following a throttle advance and existing prior to a new steady-state r.p.m., but will not falsely indicate a sudden drop in $T_7$ following throttle retardation. After a transient increase in $T_7$, the decrease to the steady-state condition follows the balancing rate of the master and slave servos. The decrease in $T_7$ due to retarded or deceleration throttle can in general be simulated as corresponding to the decrease in turbine speed represented by the slave servo because of the thermal lag of the turbine.

An alternative arrangement for the throttle control and $\Delta N_2$ systems is shown by Fig. 2 which includes an additional throttle card 145 energized at its upper terminal by a signal voltage representing $\delta_2\sqrt{\theta_2}$. The derived voltage at slider 145' is fed by line 146 to a summing amplifier 147, the output signal of which represents deceleration fuel. The amplifier 147 is also energized as indicated by a signal voltage representing $N_2/\sqrt{\theta_2}$ that can conveniently be taken from the slave servo answer card 28 of Fig. 1. The deceleration fuel signal is fed by line 148 to the lower terminal of the $\Delta N_2$ card 55 which is otherwise operated in the same manner as shown in Fig. 1. The $\Delta N_2$ servo is also operated in substantially the same manner as in Fig. 1 except that an answer card 149 is included for providing at slider 149' a $\Delta N_2$ answer signal over line 150 to the servo amplifier 45 for ensuring servo stability. This method of producing the deceleration signal results in more realistic deceleration simulation throughout the range of fuel flow.

Summarizing the sequence of events started when a steady-state condition is disturbed by movement of the throttle lever, (1) the "requested" throttle signal sensed by the "regulator" ($\Delta N_2$ system) is changed, and hence an error signal $\Delta N_2$ is generated;

(2) the fuel flow ($W_f$ servo) changes immediately as a function of a prescribed schedule "acceleration fuel flow" vs. $N_2/\sqrt{\theta_2}$;

(3) tail pipe temperature ($T_7$ servo) starts to increase due to dynamic signal $T_{dyn}$ resulting from increased fuel flow as there is virtually no immediate change in turbine r.p.m. or turbine air flow (compressor r.p.m.);

(4) turbine r.p.m. ($N_2$ servo) increases at a rate proportional to the difference between total fuel flow $W_f$ and steady-state fuel flow $W_{fss}$;

(5) engine pressure ratio ($P_7/P_2$ servo) increases as a function of turbine r.p.m.;

(6) thrust increases as a function of $P_7/P_2$; and (7) as the turbine r.p.m. approaches the requested value corresponding to the given conditions of $T_2$ and throttle lever position, the difference between $W_f$ and $W_{fss}$ is reduced to zero and a new steady-state is established.

Fig. 3 illustrates an interrelated servo system that is adapted to produce signal voltages representing certain signals used in the apparatus of Figs. 1 and 2. The basic systems used for this purpose may conveniently include altitude ($h$), true airspeed ($V_T$), Mach number (M) and outside air temperature (OAT). The input circuitry for the amplifiers of the $h$, $V_T$, and M systems are disclosed in Patent No. 2,784,501 granted March 12, 1957 to Stern et al. and assigned to the same assignee as the present invention. The OAT system is disclosed in the afore- said Patent No. 2,798,308. The $M^2$ servo system herein shown may conveniently comprise a servo amplifier that is energized from an $M^2$ function card of the above referred to Mach number servo system.

The signal voltages produced by the system of Fig. 3 represent windmilling r.p.m. $N_W$, a function of airspeed $f(V_T)$, a drag factor $\frac{1}{2}\rho V^2$, the compressor inlet temperature $T_2$ and a function of $T_2$, namely $f(T_2)$. In addition the system controls the operation of the "relight" thyratron that is in turn adapted to control energization of the flame-out relay 73.

In the circuitry of Fig. 3, the $h$ system 95 comprises a servo amplifier 96 for energizing the servo motor M that in turn operates the servo cards 97, 98 and 99. The card 97 is energized at its lower terminal by a constant a.c. signal $-E$ and is grounded at its upper terminal through a suitable resistance so that the voltage derived at slider 97' represents a function of air density $\rho$. This signal is fed by line 101 to a card 102 of the $V_T$ servo system 103, the signal voltage derived at slider 102' representing the drag factor $\frac{1}{2}\rho V^2$. This signal may be fed over line 102" to the flight computer as indicated in Fig. 1.

Windmilling r.p.m. ($N_W$) may be expressed in terms of altitude and Mach number as follows:

$$N_w = K - K_1 f(M^2) \cdot f(h)$$

where K is a biasing factor used for convenience in relating $N_W$ to the simulated windmilling range having an arbitrary lower limit of 30 m.p.h.

For obtaining the $N_W$ signal the $h$ servo card 98 is energized at its lower terminal by a voltage on line 104 from the card 105 of the $M^2$ servo system 106. The card 105 is energized at its lower terminal by a constant signal E and is grounded through a resistance at its upper terminal so that the derived signal at slider 105' represents a reverse function of $M^2$. The $h$ card 98 energized by this signal derives a signal at slider 98' that is fed to a summing amplifier 100 which is also fed by a constant voltage $-E$ representing the biasing factor K of the above equation. The resultant voltage representing $N_W$ is fed by line 107 through the $V_T$ cam switch 108 to the line 109 for energizing the slave ($N_2\sqrt{\theta_2}$) servo as indicated in Fig. 1. The switch 108 is operated by the $V_T$ servo cam 110 so that when the simulated airspeed exceeds 30 m.p.h. a switch is closed on contact 111 to feed the $N_W$ signal to the slave servo, and when airspeed is less than 30 m.p.h. the line 109 is grounded at contact 112. Thus the windmilling r.p.m. signal is produced only when airspeed exceeds a prescribed minimum windmilling velocity.

The $f(V_T)$ signal is derived according to the combined operation of the $h$, $M^2$, and $V_T$ servos. The voltage at slider 97' of the $h$ card 97 is also fed by line 113 to the $M^2$ card 114, from which a signal at slider 114' is fed by line 115 to the $V_T$ function card 116, from whence a derived signal at slider 116' representing $f(V_T)$ is fed by line 117 to the $P_7/P_2$ card 71 of Fig. 1.

The signals representing $T_2$ and $f(T_2)$ are produced according to joint operation of the $M^2$ and OAT systems. The output of the OAT amplifier 118 is fed by lines 119 and 120 to the $T_2$ amplifier 121 and the $M^2$ card 122 respectively. The card 122 derives at slider 122' a signal representing a combined function of OAT and $M^2$ that is fed also by line 123 back to the $T_2$ amplifier 121. The amplifier output signal, which corresponds to $T_2$, operates the servo motor and the cards 124 and 125. The function card 124 is energized at its upper terminal by a constant signal voltage for producing at slider 124' a signal on line 126 representing $f(T_2)$ for energizing the throttle card 3 of Fig. 1. The linear card 125 which is also energized by a constant voltage produces at slider 125' a signal $T_2$ that is fed by line 127 to the $P_7/P_2$ card 70 of Fig. 1, and also by line 128 to the "relight" thyratron.

The flame-out relay 73 for representing engine "flame"

or "flame-out" conditions is arranged to be energized or deenergized through a plurality of switches which are operated according to various simulated engine flame and relight conditions. To this end, the relay winding is energized at one terminal by a voltage E through a normally closed instructor's "flame-out" switch 135 and the other terminal may be connected to ground through different combinations of the aforesaid switches. For example, flame simulation for the starting operation is accomplished by the pilot moving the grounded "spark" switch 130 to the "spark" position, thereby completing the relay ground circuit through the normally closed "relight" and "fuel" switches 131 and 132 respectively, and the $N_2\sqrt{\theta_2}$ switch 129 that is closed as soon as the slave servo is "cranked" to exceed zero r.p.m. by the engine starter or by windmilling. This switch is controlled by cam 129' positioned by the slave servo so as to deenergize the flame relay when r.p.m. is zero, thereby representing lack of fuel due to stopping of the fuel pumps. The relight switch 131 is controlled by the relight thyratron 133 as presently described, and the fuel switch 132 which may be controlled by the instructor for simulating exhausted fuel supply. The flame-out relay 73 is now considered energized, thereby closing the holding switch 134 that completes a shunt ground circuit from the fuel switch so that the spark switch 130 can now be opened as in practice. Deenergization of the flame-out relay to simulate "trouble" can be accomplished by the instructor by opening either the fuel switch 132 or the flame-out switch 135.

In practice, flame-out may occur at high altitudes in combination with other factors including airspeed and compressor inlet temperature. When a flame-out occurs, the conventional practice is to attempt an air-start or "relight" by "windmilling" the turbine and closing the spark switch. However, there are certain flight conditions which in combination make it very difficult or impossible for the engine to relight, such as where the airspeed is either too high or too low in relation to altitude and the air density is very low due to great altitude. This is graphically illustrated by Fig. 5 which indicates in a general way the combinations of altitude (and hence air density) and airspeed determining relights or air-starts.

For the purpose of simulating the relight conditions, the relight thyratron 133 is energized by a plurality of signal voltages differing in sense and magnitude and representing the main factors determining a relight region, and the thyratron when "fired" energizes a relay 136 for opening the relight switch 131, thereby precluding reenergization of the flame-out relay as long as the adverse conditions exist. The thyratron input signals comprise a compressor inlet temperature signal $T_2$ as previously described, an altitude signal $h$ over line 137 from the $h$ card 99, slider 99', and an airspeed signal $V_T$ of opposite sense over line 138 from the $V_T$ card 139, slider 139'. The card 139 is contoured to correspond with the graph relation of Fig. 5 so that the desired $V_T$ signal varies accordingly. When the resultant of the signals which is applied to the grid of the thyratron is sufficiently positive, the thyratron will "fire" thereby energizing relay 136, opening the relight switch 131 and deenergizing the flame-out relay 73; conversely when the resultant signal is below the firing potential, the relay 136 is deenergized with the swtich 131 in the normal relight position shown. This condition also obtains for the "on-ground" condition where the $h$ signal is zero so that the flame relay can be energized by the "spark" switch to simulate a ground start. If required, the thyratron can be biased to cut-off during "starting" through the spark switch. Thus, the operation of the thyratron is controlled to correspond to the graph of Fig. 5 wherein for a given altitude there is a fairly definite range of airspeed within which satisfactory air-starts may be made. The factor $T_2$ is involved to a lesser extent, the $T_2$ signal (having the same sense as the $V_T$ signal) tending to broaden somewhat the range of the $V_T$ signal.

The functions of the flame relay 73 may be summarized as follows: when normally energized to indicate "engine flame" the relay completes part of the circuit for energizing the slave servo from the master servo answer card, Fig. 1, cuts out the low-rate feed-back circuit for the slave servo, completes part of the circuit for energizing the $T_7$ servo by the dynamic signal $T_{dyn}$ and completes the thrust circuit to the flight computer. When deenergized to indicate "flame-out," the relay cuts out the normal energizing circuit for the slave servo, cuts in (during flight) the windmilling signal $N_w$ and cuts in the low-rate feed-back circuit for controlling the turbine r.p.m. response rate during starting, etc.

Turbine r.p.m. response to acceleration and deceleration forces is based on the equation:

$$I\frac{dN}{dt}=\frac{K}{\delta_2\sqrt{\theta_2}}[W_f-W_{fss}]$$

where
$I$=rotor moment of inertia
$N$=rotor speed
$K$=engine acceleration constant
$W_f$=total fuel flow at any instant
$W_{fss}$=fuel flow required to maintain in steady state the rotor speed occurring at the given instant.

The factors I and K are important, especially at low r.p.m. and therefore must be taken into account in simulating r.p.m. response of the engine. To this end the slave servo 14, Fig. 1, may be provided with feedback variable according to different engine conditions. A normal feed-back signal $E_{fb(1)}$ is fed from the feed-back generator G on line 155 to the amplifier input terminal 33 under all operating conditions. This feed-back signal is by itself sufficient for simulating r.p.m. response at high r.p.m. when the engine has flame. However for other conditions, as during starting when the effect of rotor inertia is dominant, and following flame-out, the r.p.m. response is different and therefore a second feed-back signal $E_{fb(2)}$ is fed from the generator through flame-out relay switch 156 and line 157 to the input terminal 34, this feed-back circuit being in parallel with the first feed-back circuit so as to modify $E_{fb(1)}$. As shown, the second feed-back circuit is cut-in only when a "no-flame" condition is indicated, as during initial starting and flame-out in flight, when decrease of turbine r.p.m. is influenced by factors including rotor inertia, compressor load, etc.

An alternative system for simulating r.p.m. response is shown by Fig. 6. In this arrangement, the normal feed-back signal $E_{fb(1)}$ is fed as usual from the generator G to the input the $N_2/\sqrt{\theta_2}$ amplifier 26. The second feed-back signal $E_{fb(2)}$ is however fed under certain conditions from the generator through line 160, servo card 161 and line 162 to the input terminal 163 of the servo amplifier, this circuit being in parallel with the first feed-back circuit and therefore modifying $E_{fb(1)}$. The servo card 161 is designed so that it is energized at its lower terminal by the normal feed-back voltage from the generator and is grounded as indicated throughout its upper range of r.p.m. so that the feed-back signal derived at slider 161' is effective only during the lower range of r.p.m. within which it decreases gradually with increase in r.p.m. until it becomes zero. This feed-back control is more realistic in simulating the characteristic turbine response for both acceleration and deceleration as graphically shown by Fig. 7 which indicates the relationship between turbine r.p.m. and forces opposing change in r.p.m. In particular, that portion of the curve C extending between points 1 and 2 represents acceleration or deceleration of the turbine in the low r.p.m. range wherein the compressor effect is comparatively small and the rotor inertia effect predominates in controlling r.p.m. response. This part of the curve is substantially linear and is represented by the active lower range of the card 161. Above point 2 the compressor effect becomes proportionately larger, increasing rapidly up to the higher r.p.m. range where it dominates to such extent that the inertia effect is a minor factor relative to the loading factors of the engine compressors. The point 2 on the graph corresponds to the zero signal position on card 161 so that above this point the usual feed-back signal $E_{fb(1)}$ functions in characteristic manner throughout the upper range of curve C. It will be seen that the feed-back signal $E_{fb(2)}$ from card 161 can function to oppose the input signal $W_f$ to the amplifier during acceleration (degenerative feed-back), and assist the $N_w$ signal during deceleration (regenerative feed-back), thereby simulating the inertia effect of the rotor tending to retard r.p.m. on acceleration and to maintain a state of motion during deceleration. The phase reversal of the feed-back signal occurs upon reversal of rotation of the generator during deceleration and is with respect to the constant phase relation of the windmilling signal $N_w$ which is applied, as in the case of Fig. 1, through the flame-out relay switch 158 to the amplifier input terminal 37.

This same type of feed-back control may be used as desired for the $T_7$ servo where the $T_7$ rate varies according to the following conditions;

(1) normal operation with "flame" and $N_2$ above idle (5500) r.p.m.;

(2) starting conditions with "flame" and $N_2$ below idle r.p.m.; and (3) shutdown or flame-out with $N_2$ above idle r.p.m.

For conditions (1) and (3) the normal feed-back signal is solely used to give the maximum desired $T_7$ rate, and for condition (2) a second feed-back circuit may be connected in parallel to give the minimum $T_7$ rate for simulating starting. The second feed-back circuit can readily be inserted by the flame relay and by a cam switch for example (not shown) controlled by the $N_2$ servo.

*System operation*

The general sequence of operation of the simulating system is as follows: a ground start is simulated by first closing the "start" switch 41, Fig. 1, thereby "cranking" the slave servo to simulate starting r.p.m. This results immediately in closing the slave servo cam switch 129, Fig. 3, in the flame relay circuit. The throttle 1 is then partly opened and the "spark" switch 130, Fig. 3, is closed to energize the flame relay 73. In practice, the throttle and spark switch are connected so that opening of the throttle closes the spark switch. Starting or cranking r.p.m. of the engine is simulated by means of an input signal E from the slave card 29, this signal being grounded-out as indicated when the r.p.m. is represented as being at the upper limit of the starter operation where the "fired" engine normally takes over. In multiple engine practice, the first turbo-jet engine to be started uses an exterior power source (simulated by signal E on card 29) for starting and after the first engine is running, power from this engine is used to start the other engines. Starting of the other engines may be simulated if desired by applying to the respective card (corresponding card 29) a voltage from the operating $N_2/\sqrt{\theta_2}$ servo representing the r.p.m. of the first engine.

During starting the $W_f$ signal from the master servo normally energizing the slave servo is cut out by the $N_2$ card 63; only when the starting r.p.m. is exceeded does the slider 63' complete the $W_f$ signal circuit. Specifically, the aforesaid $N_2$ card 63 is designed so as to be grounded throughout its lower initial range 63a representing starter r.p.m., thereby cutting out the $W_f$ signal during initial starter operation; then gradually to insert the $W_f$ signal as the turbine begins to "absorb" the burning gases, upon further increase in r.p.m. through a limited range indicated at 63b, after which the full $W_f$ signal is impressed on the slider 63' throughout the conducting portion 63c. The range of windmilling r.p.m. is above the grounded section, generally including part of the section 63b.

For obtaining starting "fuel" the throttle 1 is set at a partly open "start" position so that an acceleration fuel signal $W_{fa}$ is produced by the $\Delta N_2$ system for energizing the master servo. Prior to this, the slave servo 14 which is operating under signal E at starting r.p.m., has been driving the $W_f$ servo 10 through the answer signal from the slave card 28. There is an answer signal from this card available at the start as the computing signals $\delta_2\sqrt{\theta_2}$ and $\sqrt{\theta_2}$ are greater than zero for the on-ground condition. It also follows that during starting, signals are available from the slave cards 31 and 32 (representing acceleration fuel $W_{fa}$ and $N_2$) for the $\Delta N_2$ and $N_2$ systems respectively.

The operation of the master servo in response to the fuel signal $W_{fa}$ produces a $W_f$ answer signal for $T_7$ control through the dynamic $T_{dyn}$ system; however the full $W_f$ signal is not effective to drive the slave servo until its r.p.m. is out of the starting range, at which time the energizing circuit is completed through both the flame switch 94 and the $N_2$ card 63. At this stage the engine is at "self-sustaining" r.p.m., the start switch 41 is open and the master servo is connected to cause the slave servo to follow as previously described until the two systems are in balance to indicate the steady-state "idling" condition preliminary to take-off.

The system is now in readiness for "take-off power" which is produced by advancing the throttle to the "open" position, thereby providing through the $\Delta N_2$ system a maximum acceleration fuel signal $W_{fa}$. This signal quickly drives the fast-response master servo to a position representing the total applied fuel flow $W_f$, and the answer signal in turn begins to drive the slower slave servo toward the new steady-state fuel flow $W_{fss}$. Therefore the dynamic temperature signal $(W_f - W_{fss})$ is initially high and the $T_7$ servo responds to indicate higher acceleration temperature. The slave servo in turn drives the r.p.m. servo 7 by means of the $N_2$ signal from slave card 32, until the $N_2$ answer signal from the card 49 balances the requested r.p.m. signal $N_2R$ from the throttle. At this point the $W_{fa}$ signal becomes zero and the master and slave servos come into balance as their respective answer signals $W_f$ and $W_{fss}$ equalize. The $N_2$ and $T_7$ systems accordingly become steady. The turbine is now represented as operating at steady-state maximum r.p.m., i.e. take-off power.

During the acceleration operation the $N_2$ system closely follows the slave system 14 so as to simulate the characteristic lag in r.p.m. following throttle opening; also during acceleration it will be apparent that the dynamic temperature signal rapidly increases to an initially large value due to the large $W_{fa}$ signal for indicating at the $T_7$ system characteristic high temperature on take-off acceleration. This high temperature however is of brief duration and drops to the steady-state value when the master and slave systems come into balance thereby reducing the $T_{dyn}$ signal to zero and indicating that the turbine has attained the requested r.p.m. and the steady-state temperature as well as steady-state fuel flow. At this stage it will be assumed that the simulated aircraft is "air-borne" and in "flight."

Assuming now a "flame-out" in flight, the turbine r.p.m. drops rapidly due to the heavy compressor air load and the lack of heat energy. A "windmilling" condition now exists tending to windmill the turbine at lower r.p.m. according to airspeed and other relevant factors. The characteristic r.p.m. decrease rate is simulated by means of the feed-back circuitry above described.

Flame-out is simulated initially by the instructor opening the "trouble" switch 135 to deenergize the flame relay, Fig. 3. Thus the windmilling signal $N_w$ is applied to the slave servo input terminal 37 through the flame switch 158 in the "no-flame" position. This signal now supersedes the $W_f$ signal from the master servo which is concurrently cut out by the flame switch 94, and controls the slave servo as long as the "flame-out" condition exists, assuming that the airspeed exceeds a prescribed minimum such as 30 m.p.h., referring again to Fig. 3. The slave servo in turn controls the $N_2$ servo to indicate windmilling r.p.m. and now drives the master servo by means of the answer signal $W_{fss}$. When the windmilling r.p.m., as indicated by the slave servo, has decreased to its usual range (represented by the grounded section of the slave servo card 30) the $P_7/P_2$ signal at slider 30' is grounded out so that the $P_7/P_2$ servo is run to zero by its answer voltage from card 68. This position represents unity engine pressure ratio, i.e. zero thrust, as is the case during windmilling. At this position a $T_2$ signal is derived from card 70 by reason of the ground resistance 70" for energizing the $T_7$ servo. Since the voltage from card 70 has been steadily decreasing and since the $T_7$ servo cannot receive a dynamic fuel signal due to deenergization of the flame relay, the TOT indicator 79 will approach and finally indicate $T_2$, the inlet air temperature. Simulated windmilling will continue with the $N_2$ servo indicating windmilling r.p.m. and the $T_7$ servo indicating air inlet temperature $T_2$ as long as there is no flame and airspeed exceeds 30 m.p.h. When the airspeed becomes less than 30 m.p.h. upon landing, $N_W$ has decreased below zero and the signal is cut out, Fig. 3, to prevent a negative r.p.m. signal. The slave servo together with the dependent $W_f$ and $N_2$ servos, coast to zero, except for the $T_7$ servo which still indicates $T_2$. If however during flight the flame relay is reenergized to simulate an air-start or relight, the $N_W$ signal is cut out by the flame switch 158 and concurrently the $W_f$ signal from the master servo is cut in by the flame switch 94, thereby establishing the normal driving connection between the master and slave servos previously described.

During windmilling (as in starting) it will be noted that the available acceleration and deceleration fuel signals from the slave card 31 and the master answer card 18 are available at all times. Accordingly, once the flame relay is energized to indicate an air-start, the throttle can be advanced immediately to produce an error signal $\Delta N_2$ that in turn produces an acceleration fuel signal $W_{fa}$ for the master servo. Thus the system is again in the dynamic state of acceleration which is followed by the steady-state normal operating condition.

In order to simplify the description, a number of secondary features and circuits relating to instructor override, control refinements, and the like, have been omitted from the disclosure. It will be sufficient to indicate some typical troubles that may be simulated under control of the instructor. For example, nacelle icing sometimes occurs so as partially to block the air intake for the engine. This has the effect of decreasing the engine pressure ratio, and hence thrust, and simultaneously increasing $T_7$ due to the higher fuel/air ratio. This may be simulated by the instructor simply by adjustment of a rheostat in the $P_7/P_2$ input circuit, and by applying a trouble signal of proper sense to the $T_7$ amplifier input to indicate higher temperature. For simulating abnormal $T_7$ conditions due to other factors such as "hot-starts," over-temperature on take-off, internal fire with the engine not runing, etc., the instructor may also apply appropriate trouble signals to the $T_7$ amplifier input. An automatic "hot-start" can be simulated where the starter is "failed" or turned off before a self-sustaining engine speed is obtained. Failure of the starter may be simulated simply by interrupting the starting circuit 40 from the slave card 29. Specifically, the automatic hot-start results from the fact that once the flame relay has picked up on starting it will remain energized as long as the engine is runing; therefore the dynamic acceleration signal $T_{dyn}$ from amplifier 88 continues to be applied to the $T_7$ servo. However, on failure of the starter the slave servo will continue to decrease slowly to zero or to increase at an abnormally slow rate thereby decreasing the answer signal $W_{fss}$ relative to $W_f$ so that the dynamic temperature signal (represented by $W_f-W_{fss}$) tends to increase rapidly. Accordingly the $T_7$ servo continues to represent increasing excess temperature until the slave servo reaches zero, at which time the cam switch 129 is opened, thereby causing the flame relay to drop out and the dynamic acceleration signal to be grounded out. The flame is then considered as extinguished and $T_7$ approaches the air temperature $T_2$.

The $N_2$ system can be similarly controlled as desired to represent abnormal turbine operation; also as described herein the instructor may simulate fuel failure and flame-out in flight by the trouble switches 131 and 135 respectively.

It should be understood that this invention is not limited to specific details of construction and arrangement thereof herein illustrated, and that changes and modifications may occur to one skilled in the art without departing from the spirit of the invention.

What is claimed is:

1. Apparatus for simulating steady-state and dynamic characteristics of a turbo-jet engine for high speed aircraft comprising a system including a simulated throttle control related to means for producing a signal representing requested turbine r.p.m., a system for producing a signal representing instant turbine r.p.m., means for comprising said signals and producing an error signal representing the called-for change increment of r.p.m., means for producing signals representing combined functions of simulated pressure and temperature conditions incident to the simulated flight, and a computing system responsive to said error and combined functions signals for producing signals representing respectively simulated engine dynamic and steady-state fuel flow, said computing system also producing a signal for controlling the operation of said instant r.p.m. system.

2. Apparatus as specified in claim 1 wherein said computing system also has means for producing additional signals representing available "acceleration fuel" and "deceleration fuel," and the means for producing said error signal is adapted selectively to use said additional fuel signals whereby the resulting error signal represents the called-for increment of available fuel flow.

3. Apparatus as specified in claim 2 wherein the means for producing the available acceleration fuel signal is controlled jointly according to combined functions signals and computed turbine steady-state fuel flow.

4. Apparatus as specified in claim 2 wherein the means for producing the available deceleration fuel signal is controlled jointly according to the throttle position, combined functions signals and the computed dynamic fuel flow.

5. Apparatus for simulating steady-state and dynamic characteristics of a turbo-jet engine for high speed aircraft comprising a system including a simulated throttle control related to means for producing potential representing requested turbine r.p.m., an electrical system for producing potential representing instant turbine r.p.m., means for comparing said potentials and producing an error potential representing the called-for change increment of r.p.m., means for producing potential representing combined functions of simulated pressure and temperature conditions incident to the simulated flight, and an electric computing system responsive to said error and combined functions potentials having different co-related means for producing signals representing simulated engine dynamic and steady-state fuel flow respectively, one of said co-related means also producing potential for controlling the operation of said instant r.p.m. system.

6. Apparatus as specified in claim 5 having means for producing potential representing simulated compressor inlet temperature ($T_2$) wherein said means for producing requested r.p.m. potential is also responsive to the potential representing temperature ($T_2$) thereby to represent the effect of $T_2$ on steady-state r.p.m.

7. Apparatus for simulating steady-state and dynamic characteristics of a turbo-jet engine for high speed aircraft comprising a system including a simulated throttle control related to means for producing potential representing requested change in turbine r.p.m., means for producing potential representing combined functions of simulated pressure and temperature conditions incident to the simulated flight, and an electric computing system responsive to said change and combined functions potentials for computing engine dynamic fuel flow, said computing system including a pair of normally balanced servo systems, one of which has a relatively fast response to said change potential for indicating dynamic fuel flow and the other having a slower response and being slaved to the fast servo for representing steady-state fuel flow, and an electric system representing instant turbine r.p.m. responsive to the steady-state slave servo system.

8. Apparatus for simulating steady-state and dynamic characteristics of a turbo-jet engine for high speed aircraft comprising a system including simulated throttle control means and a system for indicating instant turbine r.p.m. adapted respectively to derive signals representing called-for r.p.m. and instant r.p.m., means for comparing said signals and producing an error signal representing called-for change in r.p.m., means for producing signals representing combined functions of simulated pressure and temperature conditions incident to the simulated flight, a computing network responsive to said combined functions and error signals, said network including fast-response means responsive to said error signal for representing engine dynamic fuel flow, and relatively slow-response computing means coupled to and controlled con-jointly by said fast-response means and said combined functions signals for representing steady-state fuel flow, said steady-state means utilizing said combined functions signals for producing a signal representing instant r.p.m. for in turn controlling the aforesaid instant r.p.m. system.

9. Apparatus for simulating steady-state and dynamic characteristics of a turbo-jet engine for high speed aircraft comprising means responsive to adjustment of a simulated throttle control related to means for producing an error signal representing called-for change in r.p.m., means for producing signals representing combined functions of simulated pressure and temperature conditions incident to the simulated flight, a computing network responsive to said combined functions and error signals, said network including fast-response means responsive to said error signal for indicating engine dynamic fuel flow and relatively slow-response computing means slaved to and controlled con-jointly by said fast response means and said combined functions signals for representing steady-state fuel flow and computing $N/\sqrt{\theta}$ where N is the instant turbine r.p.m. and $\theta$ is the adiabatic temperature ratio, said slave means also adapted to produce a signal representing the engine pressure ratio, and indicating means responsive to said engine pressure ratio signal.

10. Apparatus as specified in claim 9 wherein means are provided for combining a signal representing a function of simulated airspeed with said engine pressure ratio signal for producing a signal representing engine thrust.

11. Apparatus for simulating steady-state and dynamic characteristics of a turbo-jet engine for high speed aircraft comprising a system including simulated throttle control means and a system for indicating instant turbine r.p.m. adapted respectively to derive signals representing called-for r.p.m. and instant r.p.m., means for comparing said signals and producing an error signal representing called-for change in r.p.m., means for producing signals representing combined functions of simulated pressure and temperature conditions incident to the simulated flight, a computing network normally controlled according to said combined functions signals and including a fast-response servo system responsive to said error signal for computing dynamic fuel flow and simulating turbine acceleration and deceleration, and a relatively slow-response servo system slaved to and controlled con-jointly by said fast-response servo and said combined functions signals for representing steady-state fuel flow, said steady-state servo having signal deriving means adapted to utilize said combined functions signals for deriving respectively a signal representing instant r.p.m. for in turn controlling the aforesaid instant r.p.m. system, and a signal representing steady-state fuel flow for in turn stabilizing said fast-response servo.

12. Apparatus for simulating steady-state and dynamic temperature characteristics of a turbine type engine for high speed aircraft comprising means responsive to adjustment of a simulated throttle control related to means for producing a signal representing requested change in turbine fuel flow, means for producing signals representing combined functions of simulated pressure and temperature conditions incident to the simulated flight, a first computing system responsive to said fuel change and combined functions signals for computing respectively engine steady-state fuel flow and dynamic fuel flow, said computing system including means for producing a signal representing combined functions of steady-state fuel flow and simulated compressor inlet temperature to represent steady-state turbine outlet temperature, and a second computing system responsive jointly to said steady-state signal and to other signals from said first computing system representing dynamic fuel flow conditions for indicating turbine outlet temperature.

13. Apparatus as specified in claim 12 wherein said first computing system comprises a pair of coupled servo systems, one of which is slaved to the other, and wherein the master servo is responsive to said change signal for in turn producing a signal representing dynamic fuel flow, said slave servo lagging the master servo and having means for producing according to said combined functions signals the steady-state fuel flow signal, the turbine outlet temperature system being energized for dynamic simulation according to the joint effects of said dynamic and steady-state fuel signals.

14. Apparatus for simulating steady-state and dynamic characteristics of a turbine type engine for high speed aircraft comprising means responsive to adjustment of a simulated throttle control related to means for producing a signal representing requested change in turbine fuel flow, means for producing signals representing combined functions of simulated pressure and temperature conditions incident to the simulated flight, a first computing system responsive to said change and combined functions signals for computing engine steady-state fuel flow, means for producing a signal representing combined functions of fuel flow and simulated compressor inlet temperature to represent steady-state turbine outlet temperature, a second computing system responsive to said steady-state signal for indicating turbine outlet temperature, said first computing system also adapted to produce signals according to simulated dynamic fuel flow conditions, and means controlled according to said requested change in fuel flow for selectively applying a dynamic signal to said second computing system when said change is for increased fuel flow thereby to simulate turbine temperature surge.

15. Apparatus for simulating steady-state and dynamic characteristics of a turbine type engine for high speed aircraft comprising means responsive to adjustment of a simulated throttle control related to means for producing a signal representing requested change in turbine fuel flow, means for producing signals representing combined functions of simulated pressure and temperature conditions incident to the simulated flight, a computing network including a pair of normally balanced servo systems responsive to said change and combined functions signals, one of said servos being slaved to the other and having a slower response for representing steady-state fuel flow and the master servo being initially responsive to said fuel flow change signal for computing engine dynamic fuel flow, said servos being adapted to produce signals respectively of opposite sense representing dynamic and steady-state fuel flow, said network having means for producing a signal representing combined functions of steady-state fuel flow and simulated compressor inlet temperature to compute steady-state turbine outlet temperature, and a system responsive jointly to said steady-state temperature signal and to unbalanced fuel flow signals from said servo systems representing dynamic fuel flow conditions for computing and indicating turbine outlet temperature.

16. Apparatus for simulating steady-state and dynamic characteristics of a turbo-jet engine for high speed aircraft comprising means responsive to adjustment of a simulated throttle control related to means for producing potential representing requested turbine r.p.m., an electrical system for producing potential representing instant turbine r.p.m., means for comparing said potentials and producing potential representing the called-for increment of r.p.m., means for producing potential representing combined functions of simulated pressure and temperature conditions incident to the simulated flight, and an electric computing system including a pair of normally balanced servo systems responsive to said increment and combined functions potentials for producing signals representing respectively simulated engine dynamic and steady-state fuel flow, one of said servo systems having means for producing potential for controlling the operation of said instant r.p.m. system.

17. Apparatus as specified in claim 16 wherein the servo that controls r.p.m. is coupled to and lags the other servo during dynamic operation for representing steady-state fuel flow.

18. Apparatus as specified in claim 16 wherein the servo system controlling the r.p.m. system is responsive to potential representing combined functions of simulated airspeed and altitude for simulating "windmilling" of the turbine in accordance with simulated engine "flame-out," and said servo system is provided with alternate feedback control that is selectively applied according to a manifestation of simulated loss of engine "flame" for varying the speed response of the servo whereby the instant r.p.m. system is controlled to represent characteristic "windmilling" response of the turbine.

19. Apparatus for simulating the characteristic speed response of a turbine type engine for high speed aircraft comprising means for computing a function of simulated turbine r.p.m., an electric servo system operable according to the computed r.p.m. function for in turn controlling r.p.m. indicating means, said servo system having feed-back control for varying the characteristic servo speed response, means for representing flame and no-flame conditions of the engine, and means responsive thereto for modifying the feed-back so as to obtain a different characteristic response when r.p.m. is represented as being in a lower than normal range including the starting and windmilling ranges.

20. In a system for simulating the operation of a turbine-type engine for high speed aircraft having means for producing control signals representing respectively the altitude and airspeed of the simulated flight and means operable for selectively representing "flame" and "no flame" conditions of the engine, means for controlling the operation of the selective means in simulation of adverse and favorable engine "start" conditions including discriminating means responsive to said altitude and airspeed signals according to predetermined relations of said signals to each other, said relations determining adverse and favorable "air-start" conditions, and means controlled by said discriminating means when the relationship of said altitude and airspeed signals is unfavorable to an air-start for precluding operation of said selective means to represent a "flame" condition.

21. Apparatus for simulating steady-state and dynamic characteristics of a turbo-jet engine for high speed aircraft comprising means for representing the instant turbine r.p.m., means responsive to adjustment of a simulated throttle control and to said r.p.m. means for producing an error signal representing the called-for change increment of turbine r.p.m., means for producing signals representing functions of the adiabatic temperature ratio and relative pressure ratio incident to the simulated flight, and an electric computing system responsive to said error and functions signals for producing signals representing respectively simulated engine dynamic and steady-state fuel flow, said r.p.m. means in turn being responsive to the aforesaid steady-state fuel flow signals.

22. Apparatus as specified in claim 21 wherein said computing system has means for deriving a signal representing the engine pressure ratio, and indicating means responsive to said signal for representing said ratio.

23. Apparatus as specified in claim 21 wherein said computing means has means for deriving a signal representing a function of steady-state fuel flow, means for producing a signal representing the compressor inlet temperature, and means jointly responsive to said signals for producing a signal representing steady-state turbine outlet temperature.

24. Apparatus as specified in claim 23 having means whereby the steady-state turbine outlet temperature signal is modified by the resultant of the dynamic and steady-state fuel flow signals to produce a signal representing turbine outlet temperature, and means responsive to said last-named signal for indicating said temperature.

25. Apparatus as specified in claim 19 wherein the means for modifying the feedback comprises function generating means responsive to operation of the servo system and having at least two generating ranges for representing substantially linear and nonlinear characteristics respectively according to the characteristic relationship between the simulated turbine r.p.m. and forces opposing change in r.p.m.

References Cited in the file of this patent

UNITED STATES PATENTS

| | | |
|---|---|---|
| 2,499,597 | Lukacs | Mar. 7, 1950 |
| 2,533,484 | Lukacs et al. | Dec. 12, 1950 |